(12) United States Patent
Austin et al.

(10) Patent No.: US 10,395,151 B2
(45) Date of Patent: Aug. 27, 2019

(54) SYSTEMS AND METHODS FOR LOCATING GROUP MEMBERS

(71) Applicant: SYMBOL TECHNOLOGIES, LLC, Lincolnshire, IL (US)

(72) Inventors: Timothy B. Austin, Stony Brook, NY (US); Steven P. Woerfel, Centereach, NY (US)

(73) Assignee: Symbol Technologies, LLC, Holtsville, NY (US)

( * ) Notice: Subject to any disclaimer, the term of this patent is extended or adjusted under 35 U.S.C. 154(b) by 0 days.

(21) Appl. No.: 15/791,096

(22) Filed: Oct. 23, 2017

(65) Prior Publication Data
US 2019/0122084 A1 Apr. 25, 2019

(51) Int. Cl.
*G06K 17/00* (2006.01)
*G06K 7/10* (2006.01)

(52) U.S. Cl.
CPC ..... *G06K 17/0022* (2013.01); *G06K 7/10396* (2013.01); *G06K 7/10425* (2013.01); *G06K 2017/0045* (2013.01)

(58) Field of Classification Search
CPC .......... G06K 17/0022; G06K 7/10396; G06K 7/10425; G06K 2017/0045
USPC ....................................................... 235/375
See application file for complete search history.

(56) References Cited

U.S. PATENT DOCUMENTS

| | | | | |
|---|---|---|---|---|
| 5,785,181 A | * | 7/1998 | Quartararo, Jr. | G06K 17/00 209/3.3 |
| 6,539,393 B1 | * | 3/2003 | Kabala | G01S 5/0009 |
| 6,970,088 B2 | * | 11/2005 | Kovach | G08B 13/2417 235/375 |
| 7,420,470 B2 | * | 9/2008 | Koch | G06Q 10/08 340/572.4 |
| 8,471,706 B2 | * | 6/2013 | Schuster | G06Q 10/06 340/572.1 |
| 8,558,666 B2 | * | 10/2013 | Nadkarni | G01S 5/22 340/10.1 |
| 2001/0001877 A1 | * | 5/2001 | French | G06F 21/31 713/182 |
| 2002/0165758 A1 | * | 11/2002 | Hind | G06Q 10/087 705/7.29 |
| 2004/0111454 A1 | * | 6/2004 | Sorensen | G06Q 30/02 708/200 |
| 2004/0183682 A1 | * | 9/2004 | Tenarvitz | G01S 5/16 340/573.1 |
| 2006/0044134 A1 | * | 3/2006 | Elliott | G08B 13/1427 340/539.23 |
| 2007/0241965 A1 | * | 10/2007 | Kolavennu | G01S 7/003 342/465 |
| 2008/0061967 A1 | * | 3/2008 | Corrado | G06K 7/10079 340/539.26 |

(Continued)

*Primary Examiner* — Seung H Lee

(57) ABSTRACT

A system and method for locating group members. In various aspects, a set of wearable articles are grouped together. Each of the wearable articles may include a radio frequency identification (RFID) tag. An RFID positioning system within a venue receives RFID position data indicating a location for each wearable article in the set of wearable articles. Based on the RFID position data, the system and method detect that a first wearable article within the set of wearable articles is no longer within a permitted location of the venue. The system and method transmit an alert to a mobile device associated with a second wearable article within the set of wearable articles.

29 Claims, 9 Drawing Sheets

(56) References Cited

U.S. PATENT DOCUMENTS

| | | | |
|---|---|---|---|
| 2008/0072284 A1* | 3/2008 | Horvitz | G06F 17/30241 726/2 |
| 2008/0085678 A1* | 4/2008 | Haug | G08B 21/0277 455/41.2 |
| 2008/0218335 A1* | 9/2008 | Attar | G06Q 10/08 340/539.13 |
| 2013/0066660 A1* | 3/2013 | Kopitzke | G06Q 10/02 705/5 |
| 2014/0266726 A1* | 9/2014 | Dalley, Jr. | G06Q 10/06 340/572.1 |
| 2014/0351098 A1* | 11/2014 | Shafer | G06Q 10/087 705/28 |
| 2015/0015407 A1* | 1/2015 | Markwitz | G06Q 10/00 340/691.6 |
| 2015/0070165 A1* | 3/2015 | East | G08B 13/2462 340/539.13 |
| 2015/0223019 A1* | 8/2015 | East | H04W 4/02 455/456.1 |
| 2015/0241551 A1* | 8/2015 | Jalali | G06K 7/10009 342/451 |
| 2016/0034924 A1* | 2/2016 | Sorenson | H04W 4/21 705/7.29 |
| 2016/0080907 A1* | 3/2016 | Saleem | H04W 4/70 455/456.1 |
| 2016/0363555 A1* | 12/2016 | Kang | G01N 27/227 |
| 2017/0220829 A1* | 8/2017 | Argentieri | G06K 7/10366 |
| 2017/0234964 A1* | 8/2017 | Chua | G06K 7/10009 342/451 |
| 2017/0236043 A1* | 8/2017 | Warmath | G08B 13/14 235/385 |
| 2018/0101757 A1* | 4/2018 | Harvey | G06K 17/0022 |

* cited by examiner

SYSTEMS AND METHODS FOR LOCATING GROUP MEMBERS

BACKGROUND OF THE INVENTION

People often visit various venues in groups. For example, parents may take their children to a store to go shopping, a group of friends may attend a performance together, or a tour group may fly out of an airport on the same flight. Oftentimes, these groups may decide to split up or otherwise become separated from one another.

However, in some scenarios, traditional communications using mobile phones may be inadequate to find separated group members. Inside some venues, mobile phone networks may be of poor quality due to interference caused by the structure of the venue and/or the mobile phone networks being overloaded with too many subscribers. Further, if the group includes children, not every group member may carry a mobile phone. Further still, in some scenarios, a group member may lose their mobile phone or the mobile phone may run out of battery. Accordingly, there is a need for systems and methods for locating group members.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
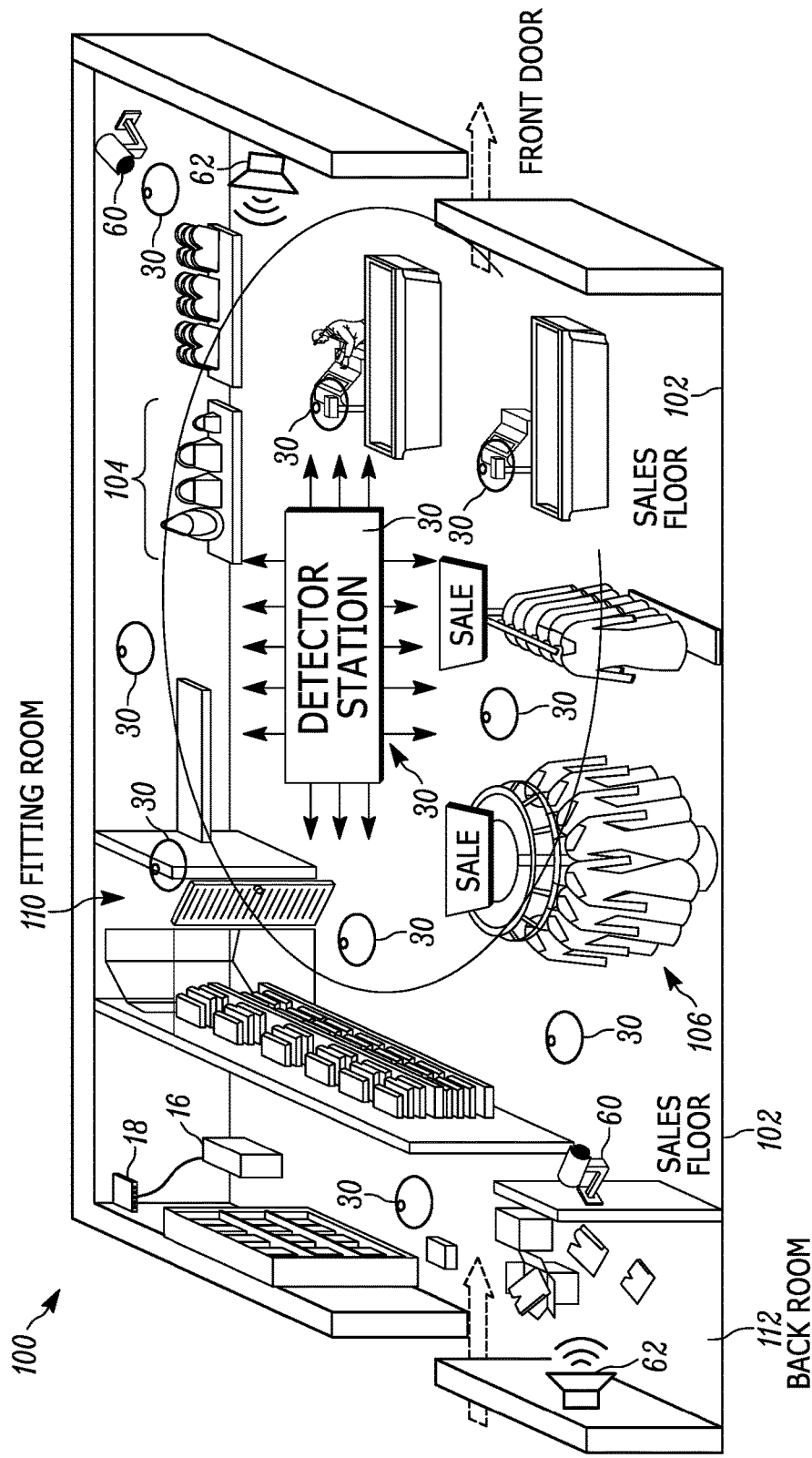
FIG. 1 is a perspective view, as seen from above, of a venue illustrating an arrangement for which a Radio Frequency Identification (RFID) positioning system within the venue is deployed to facilitate locating group members, in accordance with an example.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

Embodiments of the present disclosure include a method for tracking individuals within a venue. The method may include grouping, using at least one processor, a set of wearable articles. Each of the wearable articles may comprise a radio frequency identification (RFID) tag. The method may also include receiving, from an RFID positioning system within the venue, RFID position data indicating a location for each wearable article in the set of wearable articles. In some embodiments, the method may further include detecting, based on the RFID position data, that a first wearable article within the set of wearable articles is no longer within a permitted location of the venue and transmitting, using the at least one processor, an alert to a mobile device associated with a second wearable article within the set of wearable articles. In other embodiments, the method may further include receiving, from an electronic device, a query associated with a first wearable article of the set of wearable articles to retrieve RFID position data for a second wearable article of the set of wearable articles; filtering, using the at least one processor, the RFID position data to obtain the RFID position data corresponding to the second wearable article; and transmitting, to an electronic device, the RFID position data corresponding to the second wearable article.

In some embodiments, an indication of the permitted location may be received from the mobile device associated with the second wearable article. In some embodiments, the permitted location may be a proximity to another wearable article. In these embodiments, detecting that the first wearable article is no longer within the permitted location of the venue may include detecting, based on the RFID position data, that a distance between the first wearable article and another wearable article within the set of wearable articles exceeds a threshold distance. The other wearable article may be a third wearable article within the set of wearable articles (e.g., when an alert is set up for when two children no longer stick together). Additionally, or alternatively, the other wearable article may be the second wearable article (e.g., when an alert is setup for when a child wanders too far from the parent).

As described herein, the permitted location may be the premises of the venue. Accordingly, in some embodiments, detecting that the first wearable article is no longer within the permitted location of the venue may include detecting, based on the RFID position data, that the first wearable article is positioned at an exit of the venue. These embodiments may further include determining, using the at least one processor, a time when the at least one processor detected that the first wearable article is at the exit of the venue; and obtaining, using the at least one processor, image data indicative of the position of the first wearable article at the determined time. For example, the image data may be obtained by triggering one or more image sensors and/or by querying an image database of storing previously captured image data. Regardless, in some embodiments, the obtained image data may be transmitted to the mobile device associated with the second wearable device.

It will be appreciated that it is often appropriate for group members to leave a venue at once. Accordingly, a user may configure the alert to be triggered when, for example, a parent and child leave a venue separately or when one of them leaves the venue and the other remains on the venue premises. Thus, in some embodiments, detecting that the first wearable article is positioned at the exit of the venue may include determining, using the at least one processor, that the first wearable article is outside a threshold distance from the second wearable article.

As described herein, the wearable articles may be a wristband and/or comprise an adhesive layer (e.g., the wearable article is a sticker). In various embodiments, the RFID tags within each of the wearable articles within the set of wearable articles are passive RFID tags. It will be appreciated that passive RFID may be produced at lower cost than active RFID tags and be better suited for embodiments in which the wearable article is disposable. On the other hand, active RFID tags may be able to provide more accurate positioning than a passive RFID tag.

In some embodiments, the electronic device that transmitted the query associated with the first wearable article is a mobile device. In other embodiments, the electronic device may be a kiosk or an employee scanner unit that includes an RFID scanner and a display screen. In either embodiment, transmitting the RFID position data to the electronic device may cause the electronic device to display a map indicating the RFID position data. Additionally, in some embodiments, receiving the query at the positioning system may cause an audible alert to sound over an announcement system interconnected with the positioning system.

Embodiments of the present disclosure also include a system for tracking individuals within a venue. The system may include a plurality of radio frequency identification (RFID) readers disposed throughout the venue and an RFID tag database that stores information, such as a position, related to a plurality of RFID tags. The system may also include a controller operatively connected to the plurality of RFID readers and the RFID tag database. The controller may include at least one processor configured to receive, from a RFID tag identification system, a set of RFID tag identifiers corresponding to a set of RFID tags. Each of the RFID tags may be disposed within a wearable article. The controller may be configured to associate, in the RFID tag database, the RFID tags within the set of RFID tags with the other RFID tags within the set of RFID tags. The controller may further be configured to receive, from the plurality of RFID readers, position data corresponding to the set of RFID tags and to receive a query associated with a first RFID tag within the set of RFID tags to obtain position data corresponding to a second RFID tag within the set of RFID tags. Accordingly, the controller may be configured to access the RFID tag database using the RFID tag identifier corresponding to the second RFID tag to obtain the position data corresponding to the second RFID tag; and to transmit, to a display device, the position data corresponding to the second RFID tag.

As it is generally used herein, the term "RFID tag identification system" refers to any system capable of obtaining RFID tag information from a wearable article and/or an RFID tag. In some embodiments, the RFID tag identification system comprises at least one RFID scanner comprising at least one processor configured to read the RFID tag identifier for the RFID tags within the set of RFID tags; and to transmit the set of RFID tag identifiers to the controller. Accordingly, a person can scan an RFID tag at the RFID scanner to locate the other members of a group. Thus, in some embodiments, the query associated with the first RFID tag may be received responsive to an RFID scanner of the RFID tag identification system reading the RFID tag identifier for the first RFID tag. Additionally, in some embodiments, a particular RFID scanner of the at least one RFID scanners is operatively connected to the display device.

In various embodiments, the RFID tag identification system includes a kiosk that houses an RFID scanner of the at least one RFID scanners. The kiosk may include a vending system configured to distribute the RFID tags within the set of RFID tags. As part of the vending process, a group member may have access an account and/or a profile with a provider of the present group member locating services. Accordingly, in some embodiments, the controller may be configured to receive, from the kiosk, an identifier of a user or group member; identify a profile based on the identifier; and associate, in the RFID tag database, the RFID tags within the set of RFID tags based in part on the identified profile. Additionally, in some embodiments, the vending process may include a group member providing a phone number of a device to which the controller transmits alerts about the group. Thus, in some embodiments, the controller may be configured to receive, from the kiosk, a phone number corresponding to the first RFID tag; and to associate, in the RFID tag database, the first RFID tag with the phone number.

In various embodiments, the RFID tag identification system comprises a mobile device, the mobile device executing an application stored thereon. For example, the provider of the present group member locating services may distribute an application via an app store. In these embodiments, the mobile device may be the display device. The application may be configured to receive, via an interface of the mobile device, an indication of the RFID tag identifiers corresponding to the RFID tags within the set of RFID tags; and to transmit the set of RFID tag identifiers to the controller. In some embodiments, the application may be configured to receive, via a user interface of the mobile device, an indication of a label for a particular RFID tag within the set of RFID tags. Accordingly, in these embodiments, the controller may be configured to receive, from the mobile device, the label for the particular RFID tag, and update an entry in the RFID tag database corresponding to the particular RFID tag to indicate the label. Thus, the query associated with the first RFID tag may include the label, enabling the at least one processor of the controller to access the RFID tag database using the label to obtain the position data corresponding to the particular RFID tag.

As described herein, an alert or response to a query may include image data of a location that corresponds to a group member. Accordingly, the system may include an image database operatively connected to the controller and configured to store time-stamped image data of the venue. In some embodiments, the controller may be configured to receive a request for image data associated with the second RFID tag. In response, the controller may access the RFID tag database using the RFID tag identifier corresponding to the second RFID tag to obtain (i) a most recent position of the second RFID tag and (ii) a time at which the most recent position was obtained and to retrieve, from the image database, a set of image data corresponding the most recent position and the time. The controller may then transmit, to the display device, the set of image data.

FIG. 1 is a perspective view, as seen from above, of a venue 100 illustrating an arrangement for which a Radio Frequency Identification (RFID) positioning system within the venue 100 is deployed to facilitate locating group members. Although the example venue 100 is a retail venue, other types of venues (such as an airport, a stadium, a performance center, a museum, and so on) are envisioned. In the example embodiment of FIG. 1, the venue 100 includes a backroom 112 that has a centralized controller 16. In other embodiments, the centralized controller 16 may be located off-venue. The centralized controller 16 may be operated by store personnel and/or personnel associated with the group member tracking system.

The centralized controller 16 may comprise a networked host computer or server. The centralized controller 16 may be connected to a plurality of detector stations 30 positioned throughout the venue 100 via the network switch 18. As further described herein, the detector stations 30 are able to detect RFID tags that are embedded in wearable articles (such as wristbands or stickers) and/or on various items in the venue (such as products or other portable objects). The detector stations 30 may include other sensors in addition to the RFID sensors, for example, image sensors, ultrasonic sensors, etc. In some embodiments, in addition to any image sensors included in the detector stations 30, the example venue 100 may include one or more dedicated image sensors 60 configured to capture image data representative of various locations of the venue 100. Additionally, in some embodiments, the example venue 100 may include an announcement system that includes speakers 62 configured to emit audible alerts.

Each of the detector stations 30, the image sensors 60, and the speakers 62 may either be in either wired or wireless electronic communication with centralized controller 16 via the network switch 18. For example, in some embodiments, the detector stations 30, the image sensors 60, and the speakers 62 may be connected via Category 5 or 6 cables and use the Ethernet standard for wired communications. In other embodiments, the detector stations 30, the image sensors 60, and the speakers 62 may be connected wirelessly, using built-in wireless transceiver, and may use the IEEE 802.11 (WiFi) and/or Bluetooth standards for wireless communications. Other embodiments may include detector stations 30, image sensors 60, and speakers 62 that use a combination of wired and wireless communication.

Figure 2A:
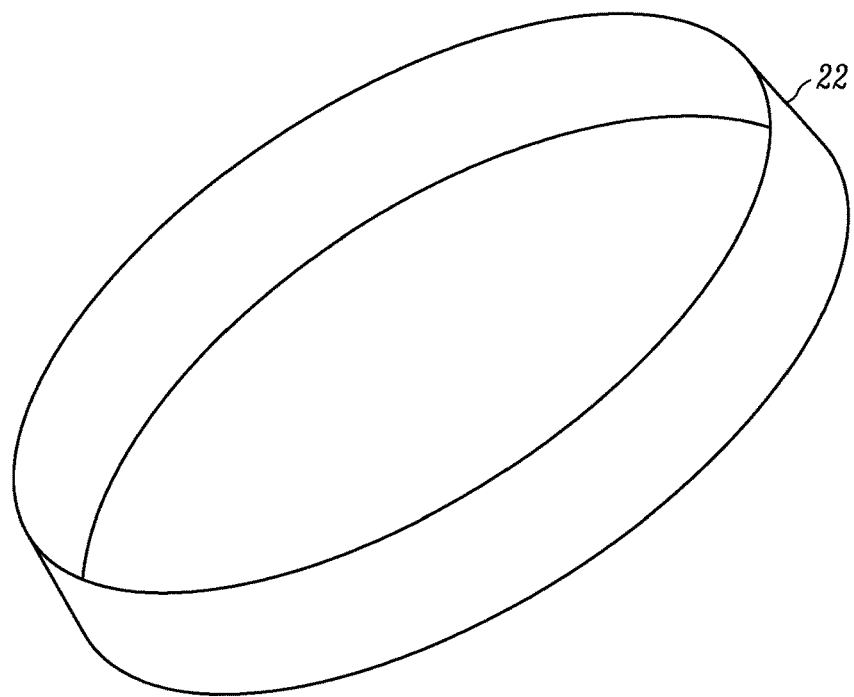
FIG. 2A is an example RFID wristband that may communicate an RFID tag identifier to the RFID positioning system of FIG. 1.

FIG. 2A is an example RFID wristband 22 that may communicate an RFID tag identifier to the RFID positioning system of FIG. 1. The RFID wristband 22 may include an RFID tag within the RFID wristband 22 that is periodically interrogated by the RFID positioning system to obtain a corresponding RFID tag identifier. A group member may wear the RFID wristband 22 on her wrist as she traverses the venue 100.

Figure 2B:
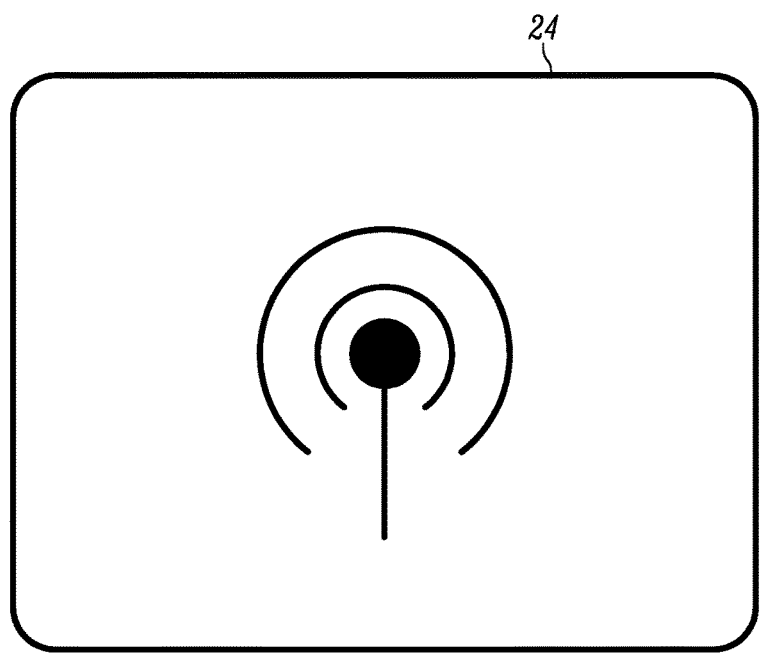
FIG. 2B is an example RFID sticker that may communicate an RFID tag identifier to the RFID positioning system of FIG. 1.

FIG. 2B is an example RFID sticker 24 that may communicate an RFID tag identifier to the RFID positioning system of FIG. 1. The RFID sticker 24 may include an RFID tag within the RFID sticker 24 that is periodically interrogated by the RFID positioning system to obtain a corresponding RFID tag identifier. The RFID sticker 24 may also include an adhesive layer that enables the group member to affix the RFID sticker 24 to the group member's clothing or to an object carried by the group member (such as a purse, a wallet, a brochure or pamphlet, a ticket, and so on). In some embodiments, the RFID sticker 24 may include a non-adhesive layer that must be peeled off to expose the adhesive layer. It will be appreciated that although the RFID wristband 22 and RFID sticker 24 are two example wearable articles, other wearable articles are envisioned. For example, a wearable article may be embedded in a souvenir distributed upon entry of the venue 100 or take another form factor that can be ported by a group member as the group member traverses the venue 100.

Figure 3:
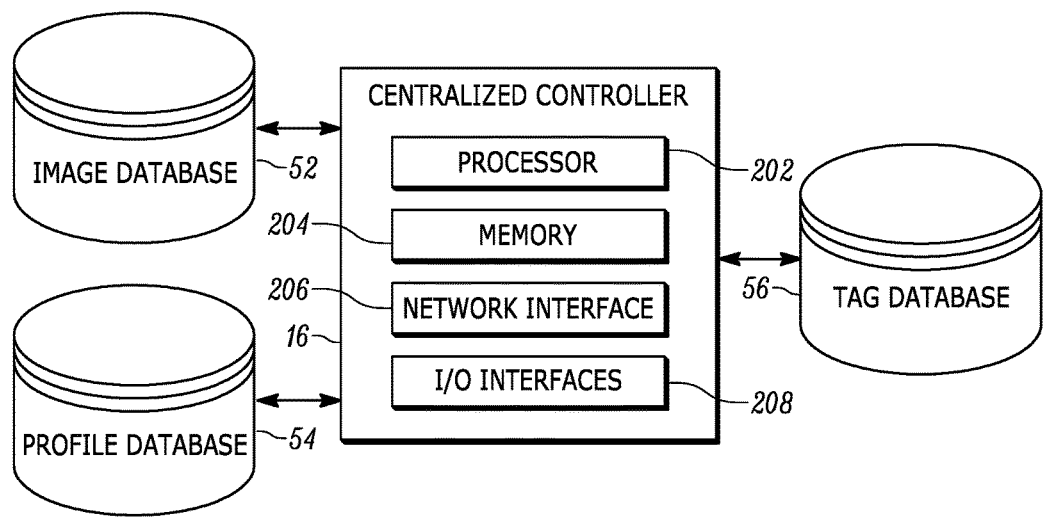
FIG. 3 is a block diagram representative of an embodiment of a centralized controller of FIG. 1.

FIG. 3 is a block diagram representative of an embodiment of centralized controller 16 of FIG. 1. The centralized controller 16 is configured to execute computer instructions to perform operations associated with the systems and methods as described herein, for example, implement the example operations represented by the block diagrams or flowcharts of the drawings accompanying this description. The centralized controller 16 may implement enterprise service software that may include, for example, Restful (representational state transfer) API services, message queuing service, and event services that may be provided by various platforms or specifications, such as the J2EE specification implemented by any one of the Oracle WebLogic Server platform, the JBoss platform, or the IBM WebSphere platform, etc. As described below, the centralized controller 16 may be specifically configured for performing operations represented by the block diagrams or flowcharts of the drawings described herein.

The example centralized controller 16 of FIG. 3 includes a processor 202, such as, for example, one or more microprocessors, controllers, and/or any suitable type of processor. The example centralized controller 16 of FIG. 2 further includes memory (e.g., volatile memory or non-volatile memory) 204 accessible by the processor 202, for example, via a memory controller (not shown). The example processor 202 interacts with the memory 204 to obtain, for example, machine-readable instructions stored in the memory 204 corresponding to, for example, the operations represented by the flowcharts of this disclosure. Additionally or alternatively, machine-readable instructions corresponding to the example operations of the block diagrams or flowcharts may be stored on one or more removable media (e.g., a compact disc, a digital versatile disc, removable flash memory, etc.), or over a remote connection, such as the Internet or a cloud-based connection, that may be coupled to the centralized controller 16 to provide access to the machine-readable instructions stored thereon.

The example centralized controller 16 of FIG. 3 may further include a network interface 206 to enable communication with other machines via, for example, one or more computer networks, such as a local area network (LAN) or a wide area network (WAN), e.g., the Internet. The example network interface 206 may include any suitable type of communication interface(s) (e.g., wired and/or wireless interfaces) configured to operate in accordance with any suitable protocol(s), e.g., Ethernet for wired communications and/or IEEE 802.11 for wireless communications.

The example centralized controller 16 of FIG. 3 includes input/output (I/O) interfaces 208 to enable receipt of user input and communication of output data to the user, which may include, for example, any number of keyboards, mice, USB drives, optical drives, screens, touchscreens, etc.

The example centralized controller 16 of FIG. 3 is operatively connected to an image database 52 that stores image data of the venue 100. To this end, the example centralized controller 16 may store any data received from the image sensors 60 and/or detectors 30 at the image database 52. Additionally, the centralized controller 16 may be operatively connected to a profile database 54 that stores user profiles corresponding to group members. The user profile may include a correspondence between group members and RFID tags, information relating to the group member's mobile device, alert preferences, and other information about each group member.

The example centralized controller 16 of FIG. 3 is also operatively connected to an RFID tag database 56 that includes records for a plurality of RFID tags located on the premises of the venue 100. The record of a particular RFID tag may include a latest location for the RFID tag, a set of historical locations for the RFID tag, an indication of other RFID tags within a set of RFID tags that includes the RFID tags, and an indication of a user corresponding to the RFID tag, and so on. Additionally, the record for the particular RFID tag may include data from the user profile corresponding to the user. For example, the record may also include a label for the RFID tag, a mobile device phone number corresponding to the user, and one or more alerts set up by the user. In some embodiments, the alert includes an indication of a RFID tag whose position is monitored to trigger the alert and a permitted location for the monitored RFID tag.

It will be appreciated that although FIG. 3 illustrates the image database 52, the profile database 54, and the tag database 56 as being external to the example centralized controller 16, other example centralized controllers 16 may internally include the image database 52, profile database 54, and/or the tag database 56.

Figure 4:
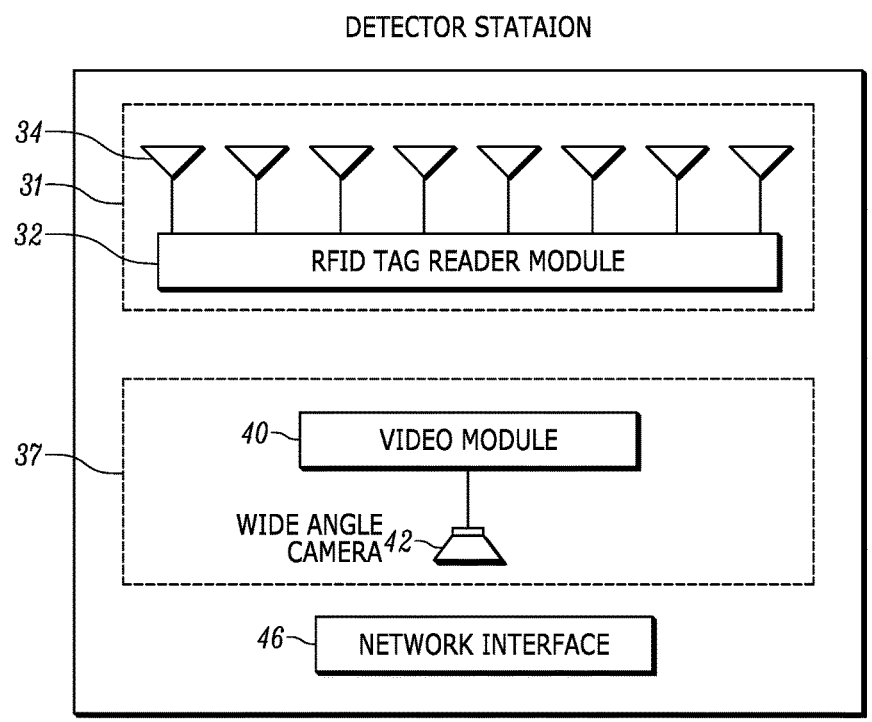
FIG. 4 is a block diagram illustrating an example implementation of a detector station, including several detectors, as may be used in the venue of FIG. 1, in accordance with an example embodiment.

FIG. 4 is a block diagram illustrating an example implementation of an embodiment of a detector station 30. In the illustrated example, the detector station 30 includes two example detectors 31 and 37, as further described herein. For example, a detector in the form of an RFID tag reader 31 is operative for reading the RFID tags embedded in the RFID wristband 22 or RFID sticker 24.

More particularly, as shown in FIG. 4, each RFID reader 31 includes an RFID tag reader module 32 that has a controller, a memory, and an RF transceiver, which are operatively connected to a plurality of RFID antenna elements 34, which are energized by the RFID module 32 to radiate RF energy (also referred to herein as a beam) over an antenna beam pattern. As those of skill will recognize, an antenna and its beam pattern can be characterized by the antenna's beam width (i.e., the antenna's half power beam width). The RF reader 31 is operated, under the control of the tag reader module 32, to transmit RF beam or wave energy to the RFID tags, and to receive RF response signals from the RFID tags, thereby interrogating and processing the payloads of the RFID tags that are in a reading zone of the RF transceiver. The RFID reading zone for a detector station 30 may be a 360° zone defined by the RFID antenna elements 34 and their collective beam patterns. In various embodiments, a detector 30 my include eight RFID antenna elements 34, each maintained in a fixed position and each having a beam pattern extending in a different direction.

During operation, the RF transceiver may capture RFID tag information that identifies RFID tags disposed on the venue 100. The centralized controller 16 may be configured to control the overhead RFID readers 31 in the plurality of detector stations 30 to read the RFID tags embedded in wearable articles, such as RFID wristbands 22 or RFID stickers 24.

The RFID transceivers determine a signal strength for the data received from the RFID tags. The comparative signal strengths at each RFID transceiver of a particular detector 30 are used to determine the location (i.e., position) and/or direction of travel of the RFID tag, using a suitable locationing/positioning technique, such as triangulation, trilateration, multilateration, etc. Such locationing and direction of travel may be determined by analyzing data from multiple detector stations 30 and centralized controller 16. The example centralized controller 16 stores the determined location of the RFID tags in the RFID tag database 56.

In embodiments in which the wearable articles include a passive RFID tag, the RFID tag may be inductively energized by the RF beam emitted from the detector stations 30. Accordingly, in these embodiments, the wearable article does not need to include a power source to transmit a RFID tag information back to the detector stations 30. As a result, the wearable articles may be manufactured at a sufficiently low cost to make it economical for the wearable articles to be disposable or otherwise replaceable upon each visit to the venue 100. That said, the lack of a power source also enables the same wearable article to be used over a longer period of time as there is no depletable power source.

In the illustrated example of FIG. 4, the detector station 30 may further include a video detector 37 operative for detecting or locating a target by capturing an image of the target in the venue 100, such as a group member moving through venue 100. More particularly, the video detector 37 may be mounted in each detector station 30 and may include a video module 40 having a camera controller that is connected to a camera 42, which may be, for example, a wide-angle field of view camera for capturing the image of a target. In some embodiments, the camera 42 may be a high-bandwidth, video camera, such as a moving picture expert group (MPEG) compression camera. In some embodiments, the camera may include wide-angle capabilities such that camera 42 would be able to capture images over a large area to produce a video stream of the images. As referred to herein, the image capture devices or video cameras (also referred to as image sensors herein) are configured to capture image data representative of the venue or an environment of the venue. Further, the image sensors described herein are example data capture devices, and example methods and apparatuses disclosed herein are applicable to any suitable type of data capture device(s). In various embodiments, the images or data from the images may be time-stamped and synchronized or fused with other data, such as RFID data, and used to further describe, via data, the venue or environment of the venue. Such synchronized or fused data may be used, for example, by the centralized controller 16 to reunite and/or locate group members as described herein.

As described, each of the detector stations 30 may collect locationing and direction of travel information from its one or more detectors, such as the RFID reader 31. That information may be correlated with the video detector 37 to capture and filter video images based on the location and/or direction of travel of the group member. In particular, a detector station 30 may filter captured video to segment out from the captured wide-angle video, images of the group member near the target sensing station, as the group member moves through the venue. That segmenting may result in discarding video images that do include a group member or discarding portions of the wide-angle video that extend beyond an area of interest surrounding and including group members.

In various embodiments, focusing, image tilting, and image panning procedures may be determined by first performing image processing on the target in the wide-angle video stream. For example, in some embodiments, a detector station 30 may perform target identification procedures over the determined field of view, procedures such as edge detection to identify the target, segmentation to segment out the target's image from other objects in the video stream, and a determination of any translational, rotational, shearing, or other image artifacts affecting the target image and that would then be corrected for before using the captured target image.

Any of the detector stations 30, including alone, together, or some combination thereof, may transmit electronic information, including any RFID, image, or other information, to the centralized controller 16 for processing. For example, the central controller 16 of FIG. 1 may include a network communication interface 206 communicatively coupled to network communication interfaces 46 of the detector stations 30 to receive sensing detector data, such as RFID information, and image data, such as a video stream from the wide-angle camera 42. If the sensing detector data includes image data, the centralized controller 16 may store the image data at the image database 52. The detector stations 30 may also receive information, commands, or execution instructions, including requests to provide additional sensory or detection information from the centralized controller 16 in order to perform the features and functionally as described herein.

Figure 5A:
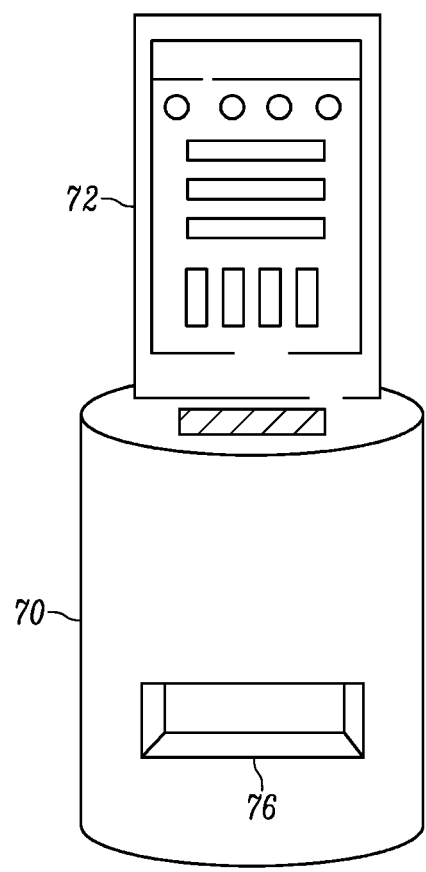
FIG. 5A is an example kiosk configured to dispense RFID tags, to scan RFID tags, and to display locations of group members within the venue of FIG. 1.

FIG. 5A is an example kiosk 70 configured to dispense wearable articles (such as RFID wristbands 202 or RFID stickers 204) that include RFID tags, to scan RFID tags, and to display locations of group members within the example venue 100 of FIG. 1. In some implementations, a venue may include multiple example kiosks 70. The example kiosk 70 includes a vending system 76 for dispensing the wearable articles, such as the RFID wristband 202 and/or the RFID sticker 204. The example kiosk 70 also includes a display screen 72 to facilitate the vending process. For example, a group member may interact with a user interface displayed on the display screen 72 to purchase a wearable article for each member of the group. The kiosk 70 may communicate to the central controller 16 RFID tag identifiers corresponding to the RFID tags embedded in each purchased wearable article. The example centralized controller 16 may then group the RFID tags together in the RFID tag database 56.

In some embodiments, the user interface may be configured to set up one or more alerts, as disclosed herein. For example, the user interface may be configured to enable the user to assign a label to the purchased wearable articles corresponding to a role or name of each group member. To this end, each group member may scan their wearable article at the RFID scanner of the example kiosk 70 and the user may enter a label for the group member. The example kiosk 70 then transmits the labels to the centralized controller 16 which updates the RFID tag database 56 with the entered labels. After establishing the wearable article-to-group member relationship, the user may interact with the user interface to set up one or more alerts. In some embodiments, setting up the alerts includes defining a permitted location for a group member. In some embodiments, the user interface may receive an indication of a phone number of a mobile device at which the user wants to receive the alerts.

In some embodiments, the user interface may also be configured to receive an indication of the group member that can be used to identify a corresponding user profile. For example, the user profile may include a set of labels previously utilized by the user. In these embodiments, when each group member scans their wearable article, the set of previously utilized labels may be presented on the user interface for selection. As another example, the user profile may include one or more alerts previously set up by the user. Accordingly, the user interface can present the previous alerts to the user to expedite the registration process.

The example kiosk 70 may also be utilized to initiate a query for other group members. After the initial vending and/or registration process, a group member may return an example kiosk 70 and scan their wearable article and/or interact with a user interface present on the display 72. In response, the example kiosk 70 transmits a query to the centralized controller 16 to retrieve position data for the other group members. When the example kiosk 70 receives the position data from the centralized controller 16, the display 72 of the kiosk 70 depicts a map of the venue 100 that indicates the position of the other group members.

Figure 5B:
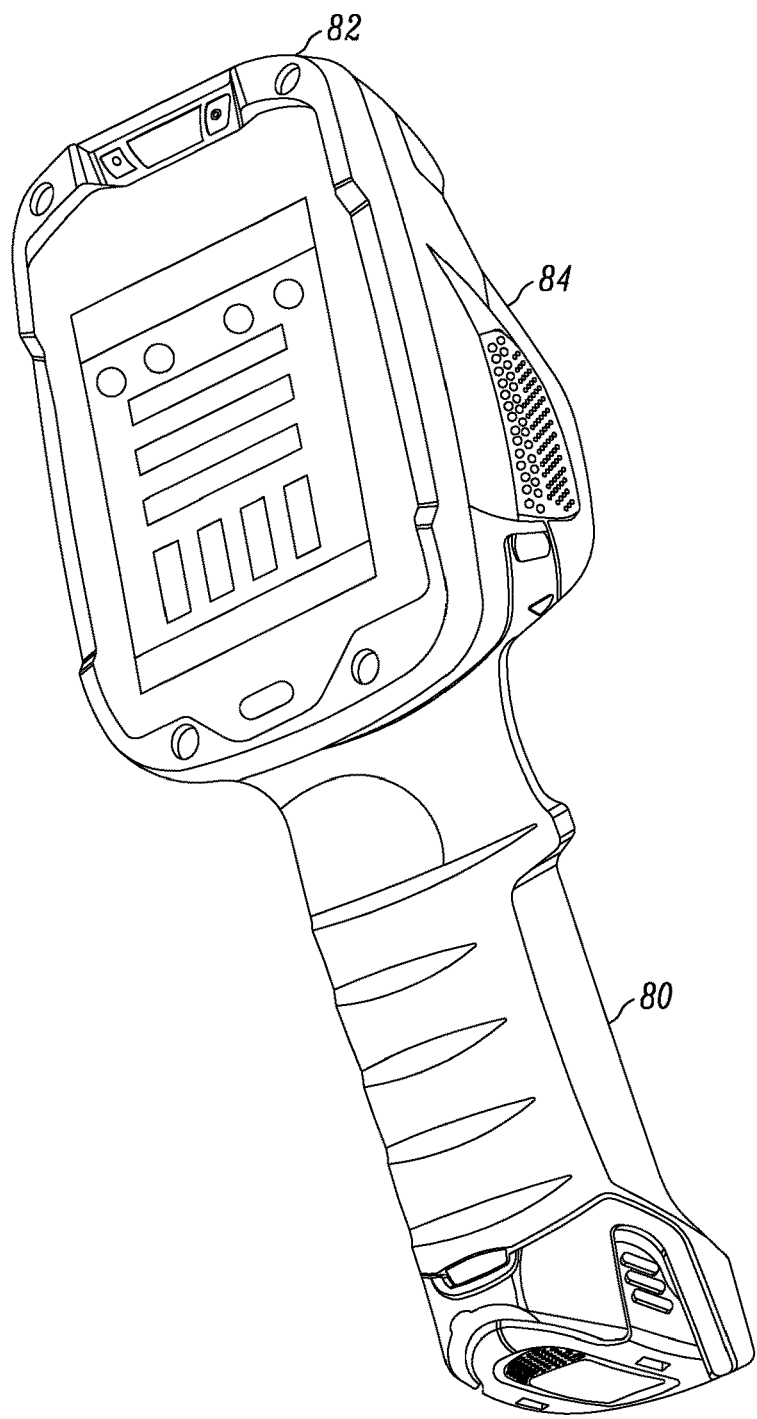
FIG. 5B is an example RFID scanner configured to scan RFID tags, and to display locations of group members within the venue of FIG. 1.

FIG. 5B is an example RFID scanner 80 configured to scan wearable articles, and to display locations of group members within the venue 100 of FIG. 1. The example RFID scanner 80 may include an RFID scanner 84 to scan an RFID tag embedded within a wearable article. The example RFID scanner 80 may also include a display screen 82 to depict group member positions on a map.

One or more employees associated with the venue 100 may carry an example RFID scanner 80. Accordingly, when a group member becomes separated from the group, either the separated group member or a group member still with the group can seek out an employee for assistance with reuniting the group. In this scenario, the employee may scan the RFID tag within the group member's wearable article to transmit a query to the centralized controller 16. The example RFID scanner 80 may display the position of the other group members on the display 82. As a result, the employee may then assist the group member in reuniting the group.

Figure 5C:
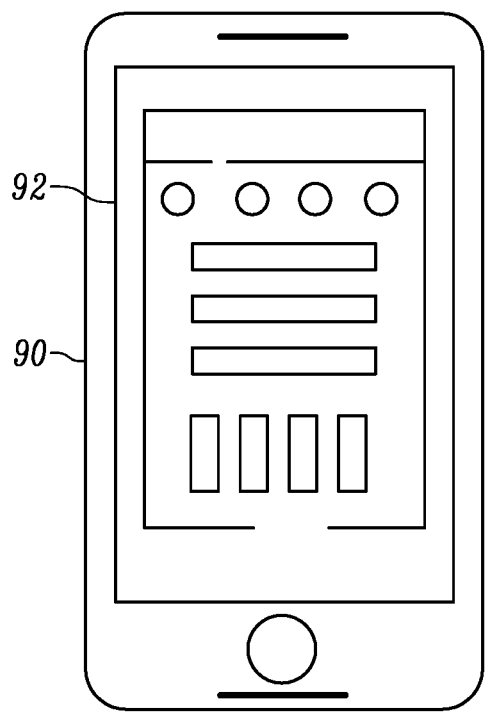
FIG. 5C is an example mobile device to obtain RFID tag information, and to display locations of group members within the venue of FIG. 1.

FIG. 5C is an example mobile device 90 to obtain RFID tag information, and to display locations of group members within the venue 100 of FIG. 1. The example mobile device 90 includes a display screen 92 on which a user interface is displayed. Although the example mobile device 90 is illustrated as a mobile phone, the mobile device 90 may be any type of personal electronic device, such as a tablet, a smart watch, smart glasses, and so on.

The example mobile device 90 executes an application to interface the centralized controller 16. In some embodiments, the application is stored on the mobile device 90 after being downloaded via an app store. In other embodiments, the application is stored on a web server and accessed via a browser application.

In either case, after the user has purchased a set of wearable articles, such as via the vending kiosk 70, the user can interact with the application to register the wearable articles with the RFID positioning system and/or to set up one or more alerts. To this end, one or more interfaces of the example mobile device 90 is utilized to obtain the tag information corresponding to the RFID tag within each wearable article. The interfaces can include wireless communication interfaces, such as Bluetooth or Near Field Communications (NFC), photographic interfaces (e.g., utilizing an image sensor of the mobile device to capture image data of a barcode or a QR code printed on the wearable article), graphical user interfaces (e.g. the user enters the tag information into a text box), or an audio interface (e.g. the user recites the tag information). The application may also present a user interface to assign a label to the purchased wearable articles. Upon obtaining the tag information and any corresponding labels, the example mobile device 90 transmits the tag information and labels to the centralized server 16, which then updates the RFID tag database 56 accordingly.

The application executing on the example mobile device 90 also enables the user to transmit a query to the centralized server 16 to determine the location within the venue 100 for the other group members. In response, the example mobile device 90 receives position data for each group member and display the locations on a map of the venue 100. Additionally, the application executing on the example mobile device 90 may be configured to receive alerts from the centralized server 16 when a group member is no longer in a permitted location. Accordingly, when the application detects that the example mobile device 90 has received an alert, the application, in some embodiments, is configured to display a location associated with the group member that left the permitted location. In some embodiments, the information includes image data of the group member leaving the permitted location.

Figure 5D:
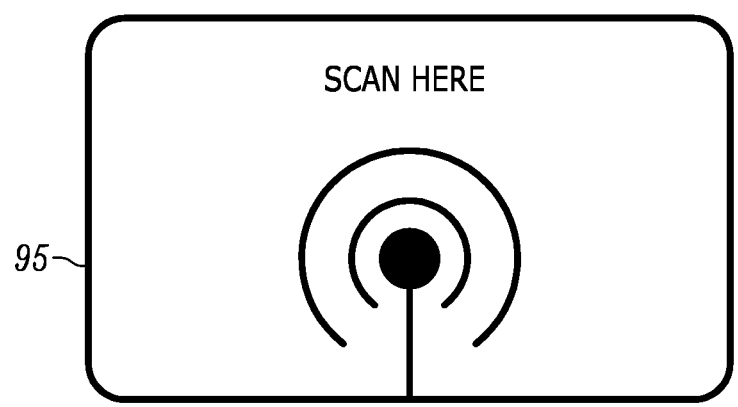
FIG. 5D is an example standalone RFID scanner configured to obtain RFID tag information from RFID tags within the venue of FIG. 1.

FIG. 5D is an example standalone RFID scanner 95 configured to obtain RFID tag information from RFID tags within the venue 100 of FIG. 1. The example RFID scanner 95 may be configured to automatically transmit a query to the centralized controller 16 in response to detecting an RFID tag of a wearable article. In response, the centralized controller 16 may query a record in the RFID tag database 56 corresponding to the detected RFID tag to identify a display device at which to display the positions for the group members of the group including the detected RFID tag. Accordingly, the centralized controller 16 may transmit the position data to the identified display device.

Each of the example kiosk 70, the example RFID scanner 80, the example mobile device 90, and the example standalone scanner 95 may be in communication with the centralized controller 16 via the network switch 18 and one or more wired or wireless networks. For example, the example kiosk 70, the example RFID scanner 80, the example mobile device 90, and the example standalone scanner 95 may be connected to a IEEE 802.11 (WiFi) network that covers the venue 100. In some implementations, the venue 100 includes a public network for end-user devices (e.g., the example mobile device 90) and a private network for devices associated with a company that deploys the present RFID positioning system (e.g., the example kiosk 70, the example RFID scanner 80, and the example standalone scanner 95).

As it is generally used herein, the term "electronic device" refers to any device capable of transmitting a query to the centralized controller 16. Accordingly, each of the example kiosk 70, the example RFID scanner 80, the example mobile device 90, and the example standalone scanner 95 are examples of an electronic device. It will be appreciated that other types of electronic devices are also envisioned. As it is generally used herein, the term "display device" refers to any device capable of displaying position data for the group members. In some embodiments, the electronic device that submits query may also be the display device for displaying the results. In other embodiments, when an electronic device transmits a query to the centralized controller 16, the display device is a different device (e.g., scanning an RFID tag at the standalone RFID scanner 95 may cause the position data to be displayed by the example mobile device 90).

Figure 6A:
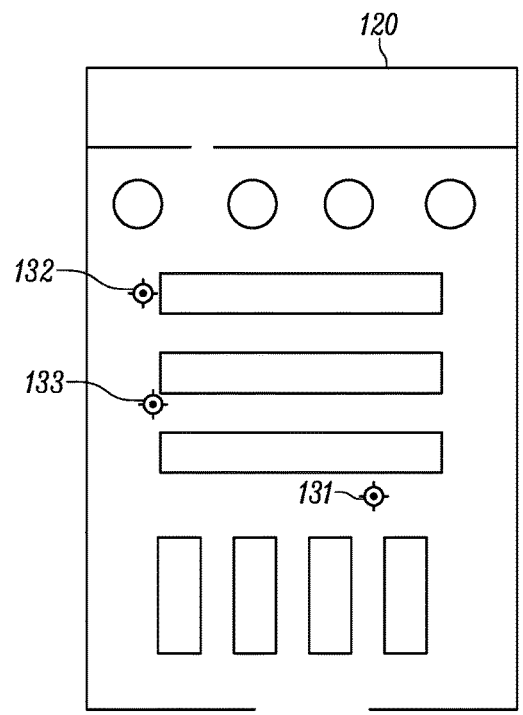
FIG. 6A is an illustration of an example display responsive to a query for group member locations within the venue of FIG. 1.

FIG. 6A is an illustration of an example map 120 displayed responsive to a query for group member locations within the venue 100 of FIG. 1. The example display 120 may be presented on the display screen of a display device, such as one of the example kiosk 70, the example RFID scanner 80, and the example mobile device 90, in response to a query from an electronic device.

In the illustrated scenario, the group has three group members: group member A (represented by location icon 131); group member B (represented by location icon 132); and group member C (represented by location icon 133). As illustrated in FIG. 6A, each group member is within the permitted locations associated with one or more alerts (e.g., the sales floor of the venue 100). Accordingly, the centralized controller 16 has not transmitted an alert to the mobile device to a mobile device of a group member.

Figure 6B:
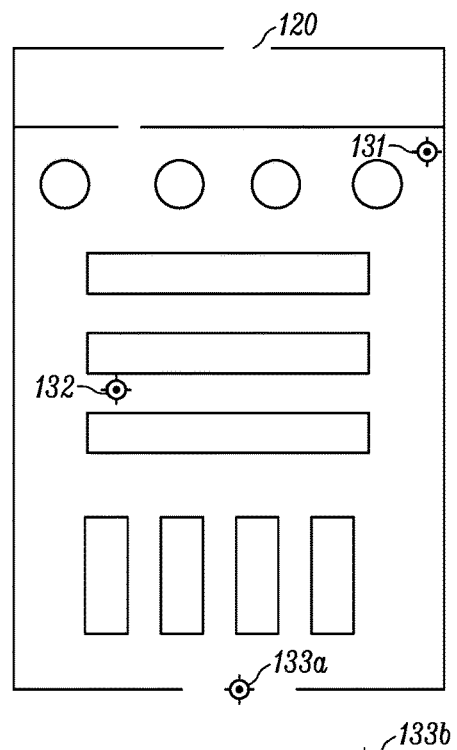
FIG. 6B is an illustration of an example display responsive to a group member leaving the venue of FIG. 1.

FIG. 6B is an illustration of the example map 120 displayed responsive to an alert that group member C left the venue 100 of FIG. 1. In the illustrated scenario, group member C is located at a location outside of the venue 100 (represented by location icon 133*b*). It should be appreciated that in some implementations, the positioning system associated with the venue 100 cannot determine the position of a group member once the group member has left the venue 100. Accordingly, the example map 120 depicts the last known location of group member C while at the venue 100 (represented by location icon 133*a*) and does not depict the location icon 133*b*. In some embodiments, the display device may additionally include a time at which group member C was at the location represented by the location icon 133*a* and/or provide an interface element that enables a user of the display device to see image data of the location represented by the location icon 133*a* at the time at which group member C was at the location represented by the location icon 133*a*.

Figure 6C:
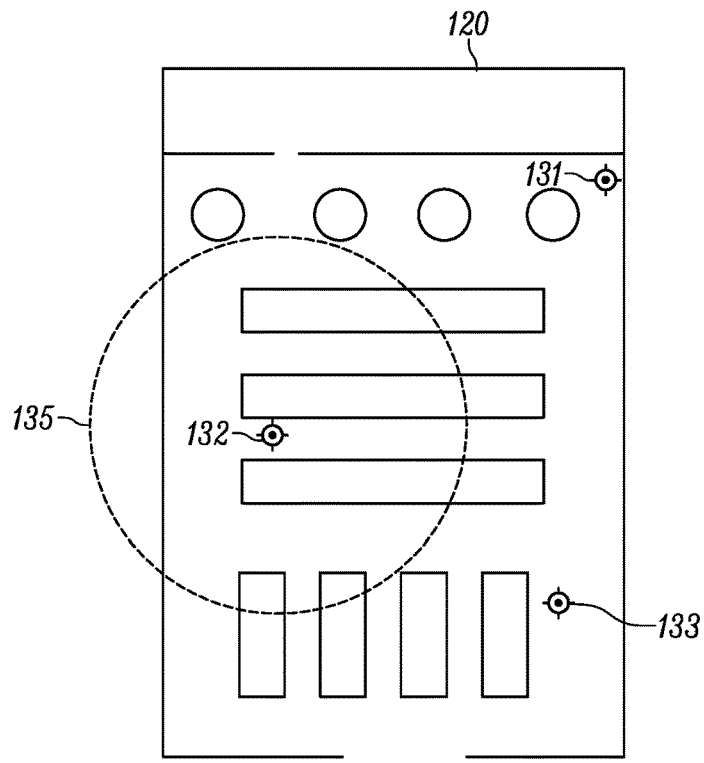
FIG. 6C is an illustration of an example display responsive to a group member becoming separated from another group member while within the venue of FIG. 1.

FIG. 6C is an illustration of an example map 120 displayed responsive to an alert that the group member C has become separated from group member B while within the venue 100 of FIG. 1. To this end, the permitted location associated with the alert for group member C may be a threshold distance from group member B. Accordingly, in the illustrated scenario, the permitted location for group member C may be defined by the circular boundary 135. The centralized controller 16 transmitted the alert to the display device upon detecting that group member C is no longer located with the boundary 135.

Figure 7:
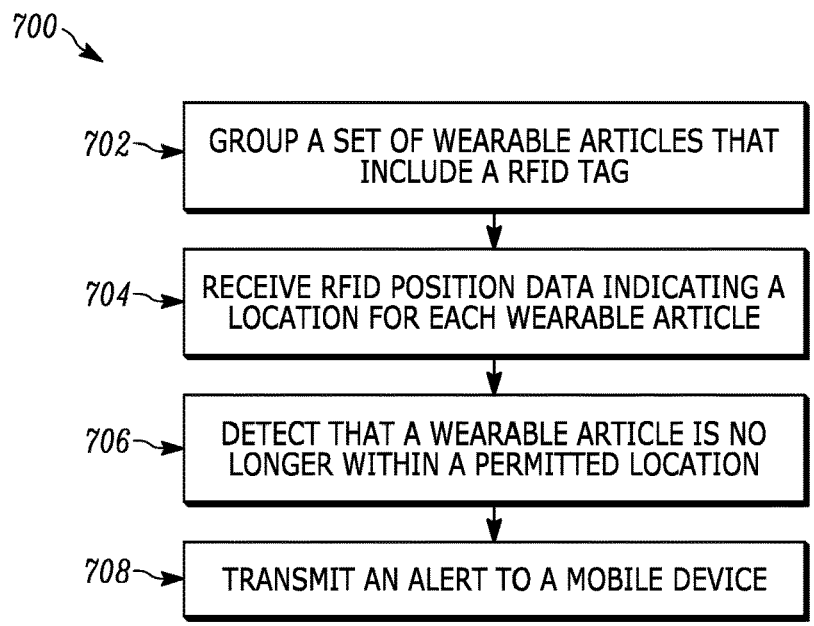
FIG. 7 is a flow chart of a method for alerting a group member about the location of another group member, in accordance with an example embodiment.

FIG. 7 is a flow chart of a method 700 for alerting a group member about the location of another group member, in accordance with an example embodiment. As described herein, the method 700 may be performed by a centralized controller 16 of a venue 100. The method 700 may begin at block 702 when the centralized controller 16 groups a set of wearable articles (such as RFID wristbands 202 or RFID stickers 204) that include a RFID tag together. In some embodiments, the centralized controller 16 may group the set of wearable articles in response to receiving a set of RFID tag identifiers from an RFID tag identification system. To group the wearable articles, the centralized controller 16 accesses an RFID tag database 56 operatively connected to the centralized controller 16. If the RFID tag database 56 includes a record corresponding to the RFID tag identifiers, the centralized controller 56 may update each record to include an indication of the other RFID tag identifiers within the set of RFID tag identifiers. If not, the centralized controller 16 may create a record in the RFID tag database

56 that includes an indication of the other RFID tag identifiers within the set of RFID tag identifiers.

In some embodiments, the RFID tag identification system may include other information about the wearable articles when transmitting the set of RFID tag identifiers. For example, the centralized controller 16 may receive a label associated with a wearable article, a mobile phone number associated with a wearable article, an indication of a user profile with which to associate a wearable article, and so on. In one scenario, as described herein, the mobile phone number may correspond to a mobile device of a parent that wants to receive alerts about her children. Accordingly, the centralized controller 16 may update the records in the RFID tag database 56 to include any additionally received information.

At block 704, the centralized controller 16 receives position data indicating a location for each wearable article. More particularly, one or more detectors 30 may detect an transmission from the RFID tags embedded in the wearable articles. In some embodiments, the detectors 30 may then communicate amongst themselves to determine a position of each wearable article at the venue 100 based on known positioning techniques. In these embodiments, the detectors 30 may communicate to the centralized controller 16 the determined position of the wearable articles. In other embodiments, the detectors 30 communicate the raw data sensed by each detector 30 to the centralized controller 16. In these embodiments, the centralized controller 16 analyzes the raw data to determine the exact position for each wearable article.

In some embodiments, the centralized controller 16 then updates the records in the RFID tag database 56 to include an indication the position. The position may be based on a coordinate system specific to the venue (e.g., the south west corner is coordinate {0,0}). The centralized controller 16 may also include a time-stamp that indicates when the wearable article was at the determined position.

The centralized controller 16 may analyze the position data in view of one or more alerts associated with wearable articles within the set of wearable articles. For example, a wearable article corresponding to a parent may be associated with an alert for when wearable articles corresponding to one or more children leave the venue 100. Accordingly, the alert may associate each wearable article corresponding to the children with a permitted location of the premises of the venue 100. As another example, the parent may set up an alert for when the children leaves a designated area of the venue 100 (e.g., a child care area, a toys section, an eatery, and so on). Accordingly, the alert may associate each wearable article corresponding to the children with a permitted location of the designated area of the venue 100.

In other scenarios, the permitted location for a particular wearable article may be a threshold distance from another wearable article. For example, the parent may be associated with an alert for when one child wanders away from the other (i.e., the parent wants the children to stick together). Accordingly, the alert may associate each of the wearable articles corresponding to the children with a permitted location of a threshold distance from the other's wearable article. As another example, the parent may be associated with an alert for when a child wanders too far away from her. Accordingly, the alert may associate the child with a permitted location of a threshold distance from the parent's wearable article. It will be appreciated that the foregoing alerts are merely example alerts and other alerts associated with other types of permitted locations are also envisioned.

At block 706, the centralized controller 16 detects that a wearable device within the set of wearable devices is no longer within a permitted location as defined by the one or more alerts. To this end, the centralized controller 16 may compare the position of each group member to the permitted locations associated with each alert.

It should be appreciated that, for alerts associated with a group member exiting the venue 100, the alert may be overridden if all of the group members are within a threshold distance of one another (i.e., the group is leaving the venue 100 as a group). That is, for example, there is no need to alert a parent that a child is leaving the venue 100, when the parent is already with the child. Accordingly, for alerts based on detecting that a wearable article is positioned at an exit of the venue, the centralized controller 16 may further determine that the wearable article is beyond a threshold distance from other another wearable article in the group of wearable articles before detecting that the wearable article is not within the permitted location.

At block 708, the centralized controller 16 transmits an alert to a mobile device, such as the mobile device corresponding to the parent. To this end, as described herein, the record in the RFID tag database 56 corresponding to the parent's wearable article may include a phone number corresponding to the mobile device. In some embodiments, the centralized controller 16 transmits a text message indicating the alert to the mobile device. The text message may include link to a website that contains more detailed information associated with the alert. In other embodiments, the centralized controller 16 transmits a push message formatted in accordance with an application executing on the mobile device. Upon user interaction with the push message, the mobile device may launch the application to view more detailed information about the alert. In some embodiments, the push message further causes the application to display the position data on a map of the venue 100.

In some embodiments, the more detailed information may include image data representative of the group member that left a permitted location. To this end, the centralized controller 16 may determine a time when the alert was triggered as well as a position of the wearable article that triggered the alert. Using the time and position, the centralized controller 16 may query an image database 52 to obtain image data (such as still photos or video) of the wearable device leaving the permitted location. Accordingly, the centralized controller 16 may include the queried image data when transmitting the alert to the mobile device and/or when the mobile device views the more detailed information upon clicking a link or launching the application.

In some scenarios, the location and image data may be insufficient to help the group members reunite. Accordingly, the application and/or website may include the ability to request an alert to sound over one or more speakers 62 of a PA system of the venue 100. To this end, the centralized controller 16 may be configured to receive the request to sound an alert and generate synthesized speech that provides instructions to the missing group member on how to reunite with the remaining group members.

It should be appreciated that the foregoing references a parent-child relationship as one example type of a relationship between group members. Other groups may have different relationships between group members, such as friend, buddy-system partner, group leader, and so. Accordingly, it is envisioned that other types of alerts may be utilized for these other types of groups.

Figure 8:
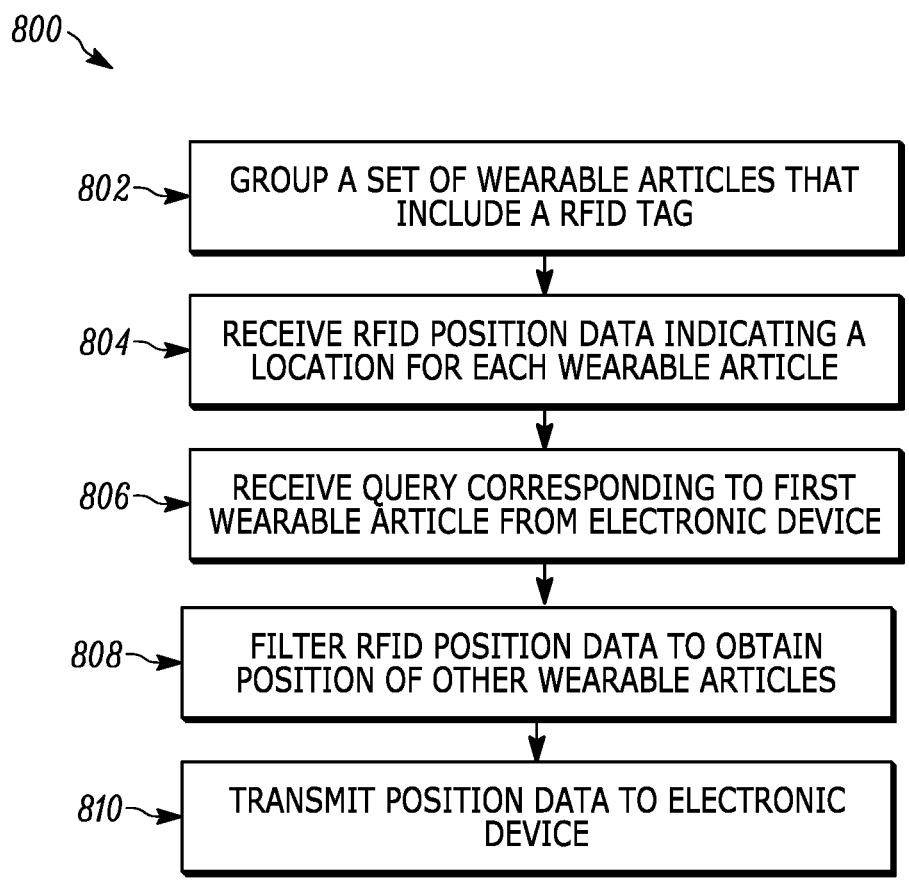
FIG. 8 is a flow chart of a method for responding to a query for group member locations, in accordance with an example embodiment.

FIG. 8 is a flow chart of an example method 800 for responding to a query for group member locations, in accordance with an example embodiment. As described herein, the method 800 may be performed by a centralized controller 16 of a venue 100. The method 800 may begin at block 802 when the centralized controller 16 groups a set of wearable articles (such as RFID wristbands 202 or RFID stickers 204) that include a RFID tag together. At block 804, the centralized controller 16 receives RFID position data indicating a location for each wearable article within the set of wearable articles. It should be appreciated that the centralized controller 16 may perform substantially similar actions at blocks 802 and 804 when performing the method 800 as when, as described above, the centralized controller 16 performs the actions associated with blocks 702 and 704, respectively, when performing the method 700.

At block 806, the centralized controller 16 receives, from an electronic device, a query corresponding to a first wearable article of the set of wearable articles. For example, the query may be received in response to wearable article being scanned at an example kiosk 70 or by an example RFID scanner 80. As another example, the query may be received in response to a user interaction with an application executing on an example mobile device 90. The query may include an indication of the device that transmitted the query.

In some embodiments, the centralized controller 16 may access the RFID tag database 56 to access a record corresponding to the first wearable article. As described herein, the record in the RFID tag database 56 may include an indication of the other wearable articles within the set of wearable articles. Accordingly, based on the information in the record corresponding to the first wearable article, the centralized controller 16 may identify the records in the RFID tag database 56 corresponding to the other wearable articles.

At block 808, the centralized controller 16 filters the received RFID position data to obtain the position of the other wearable articles. More particularly, as described herein, the centralized controller 16 updates the RFID tag database 56 with position data as it is received from controller 30 disposed on the venue 100. Accordingly, to filter the received RFID position data, the centralized controller 16 may access the record in the RFID tag database 56 to obtain the most recent position data in the identified records corresponding to the other wearable articles.

At block 810, the centralized controller 16 transmits the obtained position data to an electronic device. In some embodiments, the centralized controller 16 transmits the obtained position data to the device that the query indicates transmitted the query. In other embodiments, the centralized controller 16 transmits the position data to a different electronic device than from which the centralized controller 16 received the query. For example, in response to the first wearable article being scanned at the example kiosk 70 or the example standalone scanner 95, the centralized controller 16 may transmit the position data to the example mobile device 90.

In some embodiments, the centralized controller 16 transmit the position data to the electronic device as an image file that depicts a map of the venue 100 depicting the position data for the wearable articles within the set of wearable articles. In other embodiments, the centralized controller 16 transmits the position data in a format that causes the electronic device to launch an application and/or open a particular user interface included in the application. The application may then cause the electronic device to display a map of the venue 100 that includes the position data of the wearable articles within the set of wearable articles.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The patent claims at the end of this patent application are not intended to be construed under 35 U.S.C. § 112(f) unless traditional means-plus-function language is expressly recited, such as "means for" or "step for" language being explicitly recited in the claim(s). The systems and methods described herein are directed to an improvement to computer functionality, and improve the functioning of conventional computers.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A method for tracking individuals within a venue, the method comprising:
    grouping, with at least one processor, a set of wearable articles, each of the wearable articles comprising a radio frequency identification (RFID) tag;
    receiving, from an RFID positioning system within the venue, RFID position data indicating a location for each wearable article in the set of wearable articles;
    detecting, based on the RFID position data, that a first wearable article within the set of wearable articles is no longer within a permitted location of the venue; and
    transmitting, using the at least one processor, an alert to a mobile device associated with a second wearable article within the set of wearable articles,
    wherein the permitted location is a proximity to another wearable article; and
    wherein detecting that the first wearable article is no longer within the permitted location of the venue comprises detecting, based on the RFID position data, that a distance between the first wearable article and another wearable article within the set of wearable articles exceeds a threshold distance.

2. The method of claim 1, wherein the other wearable article is the second wearable article.

3. The method of claim 1, wherein the other wearable article is a third wearable article within the set of wearable articles.

4. The method of claim 1, wherein detecting that the first wearable article is no longer within the permitted location of the venue comprises:
    detecting, based on the RFID position data, that the first wearable article is positioned at an exit of the venue.

5. The method of claim 4, further comprising:
    determining, using the at least one processor, a time when the at least one processor detected that the first wearable article is at the exit of the venue; and
    obtaining, using the at least one processor, image data indicative of the position of the first wearable article at the determined time.

6. The method of claim 5, further comprising:
    transmitting, to the mobile device associated with the second wearable article, the obtained image data.

7. The method of claim 4, wherein detecting that the first wearable article is positioned at the exit of the venue comprises:
    determining, using the at least one processor, that the first wearable article is outside a threshold distance from the second wearable article.

8. The method of claim 1, further comprising:
    receiving, from the mobile device associated with the second wearable article, an indication of the permitted location.

9. The method of claim 1, wherein the wearable article comprises a wristband.

10. The method of claim 1, wherein the wearable article comprises an adhesive layer.

11. The method of claim 1, wherein the RFID tags within each of the wearable articles within the set of wearable articles are passive RFID tags.

12. A method for tracking individuals within a venue, the method comprising:
    grouping, using at least one processor, a set of wearable articles, each of the wearable articles comprising a radio frequency identification (RFID) tag;
    receiving, from an RFID positioning system within the venue, RFID position data indicating a location for each wearable article in the set of wearable articles;
    receiving, from an electronic device, a query associated with a first wearable article of the set of wearable articles to retrieve RFID position data for a second wearable article of the set of wearable articles;
    filtering, using the at least one processor, the RFID position data to obtain the RFID position data corresponding to the second wearable article; and
    transmitting, to an electronic device, the RFID position data corresponding to the second wearable article.

13. The method of claim 12, wherein the electronic device is a mobile device associated with the first wearable article.

14. The method of claim 12 wherein the electronic device comprises an RFID scanner and a display screen.

15. The method of claim 12, wherein transmitting the RFID position data to the electronic device causes the electronic device to display a map indicating the RFID position data.

16. The method of claim 12, further comprising:
    responsive to receiving the query, causing an audible alert to sound over an announcement system interconnected with the positioning system.

17. A system for tracking individuals within a venue, the system comprising:
    a plurality of radio frequency identification (RFID) readers disposed throughout the venue;
    an RFID tag database;

a controller operatively connected to the plurality of RFID readers and the RFID tag database, the controller comprising at least one processor configured:

to receive, from a RFID tag identification system, a set of RFID tag identifiers corresponding to a set of RFID tags, each of the RFID tags being disposed within a wearable article;

to associate, in the RFID tag database, the RFID tags within the set of RFID tags with the other RFID tags within the set of RFID tags;

to receive, from the plurality of RFID readers, position data corresponding to the set of RFID tags;

to receive a query associated with a first RFID tag within the set of RFID tags to obtain position data corresponding to a second RFID tag within the set of RFID tags;

to access the RFID tag database using the RFID tag identifier corresponding to the second RFID tag to obtain the position data corresponding to the second RFID tag; and to transmit, to a display device, the position data corresponding to the second RFID tag.

18. The system of claim 17, wherein the RFID tag identification system comprises at least one RFID scanner comprising at least one processor configured:

to read the RFID tag identifier for the RFID tags within the set of RFID tags; and to transmit the set of RFID tag identifiers to the controller.

19. The system of claim 18, wherein the query associated with the first RFID tag is received responsive to an RFID scanner of the RFID tag identification system reading the RFID tag identifier for the first RFID tag.

20. The system of claim 18, wherein a particular RFID scanner of the at least one RFID scanners is operatively connected to the display device.

21. The system of claim 17 wherein the RFID tag identification system includes a kiosk that houses an RFID scanner of the at least one RFID scanners, wherein the kiosk includes a vending system configured to distribute the RFID tags within the set of RFID tags.

22. The system of claim 21 wherein the at least one processor of the controller is configured:

to receive, from the kiosk, an identifier of a user;

to identify a profile based on the identifier; and to update, in the RFID tag database, records corresponding to the RFID tags within the set of RFID tags based in part on the identified profile.

23. The system of claim 21 wherein the at least one processor of the controller is configured:

to receive, from the kiosk, a phone number corresponding to the first RFID tag; and to associate, in the RFID tag database, the first RFID tag with the phone number.

24. The system of claim 17, wherein the RFID tag identification system comprises a mobile device, the mobile device executing an application stored thereon, the application configured:

to receive, via an interface of the mobile device, an indication of the RFID tag identifiers corresponding to the RFID tags within the set of RFID tags; and to transmit the set of RFID tag identifiers to the controller.

25. The system of claim 24, wherein:

the application is configured to receive, via a user interface of the mobile device, an indication of a label for a particular RFID tag within the set of RFID tags; and the at least one processor of the controller is configured:

to receive, from the mobile device, the label for the particular RFID tag, and to update an entry in the RFID tag database corresponding to the particular RFID tag to indicate the label.

26. The system of claim 25, wherein the query associated with the first RFID tag includes the label, and the at least one processor of the controller is configured to access the RFID tag database using the label to obtain the position data corresponding to the particular RFID tag.

27. The system of claim 24, wherein mobile device is the display device.

28. The system of claim 17 further comprising an image database operatively connected to the controller and configured to store time-stamped image data of the venue.

29. The system of claim 28, wherein the at least one processor of the controller is configured:

to receive a request for image data associated with the second RFID tag;

to access the RFID tag database using the RFID tag identifier corresponding to the second RFID tag to obtain (i) a most recent position of the second RFID tag and (ii) a time at which the most recent position was obtained;

to retrieve, from the image database, a set of image data corresponding the most recent position and the time; and to transmit, to the display device, the set of image data.

* * * * *